(12) United States Patent
Niwa et al.

(10) Patent No.: US 7,679,361 B2
(45) Date of Patent: Mar. 16, 2010

(54) POSITION SENSOR HAVING TUBULAR DETECTION COIL

(75) Inventors: Masahisa Niwa, Suita (JP); Yukiko Inooka, Takarazuka (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 273 days.

(21) Appl. No.: 11/575,009

(22) PCT Filed: May 12, 2006

(86) PCT No.: PCT/JP2006/309534

§ 371 (c)(1),
(2), (4) Date: Mar. 9, 2007

(87) PCT Pub. No.: WO2006/121146

PCT Pub. Date: Nov. 16, 2006

(65) Prior Publication Data

US 2008/0258739 A1    Oct. 23, 2008

(30) Foreign Application Priority Data

May 12, 2005   (JP) ............................. 2005-140207
May 12, 2005   (JP) ............................. 2005-140208

(51) Int. Cl.
G01B 7/14 (2006.01)
(52) U.S. Cl. ............................. 324/207.16; 324/207.24; 336/45; 336/136
(58) Field of Classification Search ................................ 324/207.15–207.19, 207.24, 207.26, 249
See application file for complete search history.

(56) References Cited

U.S. PATENT DOCUMENTS

| | | | |
|---|---|---|---|
| 4,406,999 A * | 9/1983 | Ward ..................... | 340/870.31 |
| 5,003,258 A | 3/1991 | Mancini | |
| 5,045,785 A | 9/1991 | Hansen | |
| 6,580,264 B2 * | 6/2003 | Nekado ................. | 324/207.16 |
| 6,812,693 B2 * | 11/2004 | Heinrich et al. ........ | 324/207.15 |
| 6,909,279 B2 | 6/2005 | Niwa | |

(Continued)

FOREIGN PATENT DOCUMENTS

DE            4225533           2/1994

(Continued)

OTHER PUBLICATIONS

English Language Abstract of JP 2001-021306.

(Continued)

*Primary Examiner*—Jay M Patidar
(74) *Attorney, Agent, or Firm*—Greenblum & Bernstein, P.L.C.

(57) ABSTRACT

A compact position sensor with high operational reliability is provided. This sensor has a tubular detection coil, a magnetic core movable in the detection coil, a drive circuit for the detection coil, a signal processing circuit for converting a change in impedance of the detection coil into an electric signal, and a guide means for guiding a movement of the magnetic core in the detection coil. The guide means has a guide portion connected to the magnetic core and a support portion for slidably supporting the guide portion. The magnetic core can be smoothly displaced in the detection coil without contacting an inner surface of the detection coil by a sliding movement of the guide portion relative to the support portion.

16 Claims, 7 Drawing Sheets

U.S. PATENT DOCUMENTS 7,262,592 B2 * 8/2007 Proksch et al. ......... 324/207.18

FOREIGN PATENT DOCUMENTS

| EP | 0258468 | 3/1988 |
| --- | --- | --- |
| EP | 0447017 | 9/1991 |
| EP | 0583649 | 2/1994 |
| JP | 42-019122 | 11/1942 |
| JP | 56-104603 | 8/1981 |
| JP | 5-071905 | 3/1993 |
| JP | 5-034506 | 5/1993 |
| JP | 2001-021306 | 1/2001 |
| JP | 2002-090106 | 3/2002 |
| JP | 2002-344188 | 11/2002 |

OTHER PUBLICATIONS

English Language Abstract of JP 42-019122.
English Language Abstract of JP 5-071905.
English Language Abstract of JP 5-034506.
English Language Abstract of JP 2002-344188.
English Language Abstract of JP 56-104603.
English Language Abstract of JP 2002-090106.
U.S. Appl. No. 11/574,610 to Niwa et al., filed Mar. 2, 2007.
English language Abstract of EP 0583649, Feb. 23, 1994.
English language Abstract of EP 0258468, Mar. 9, 1988.
English language Abstract of EP 0447017, Sep. 18, 1991.

* cited by examiner

POSITION SENSOR HAVING TUBULAR DETECTION COIL

TECHNICAL FIELD

The present invention relates to a position sensor using a change in impedance of a detection coil caused by a displacement of a magnetic core.

BACKGROUND ART

A position sensor, which has the capability of outputting an electrical signal according to a change in impedance of a tubular detection coil caused by a physical displacement of a magnetic core in the detection coil, has been utilized for measurement and control in many technical fields such as internal combustion and electric power facility. In this kind of position sensor, it is not difficult to imagine that a change in impedance of the detection coil resulting from an external factor other than the displacement of the magnetic core becomes a cause of deteriorating the detection accuracy. For example, during the displacement of the magnetic core made of a magnetic metal material such as ferrite in the detection coil, when the magnetic core comes into contact with an inner peripheral surface of the detection coil, and receives an external force such as stress or strain, a change in magnetic permeability of the magnetic core occurs. This phenomenon is generally known as the Villari effect. Since such a change in magnetic permeability leads to variations in detection accuracy, a countermeasure for preventing that the magnetic core receives the stress or strain is important to ensure the operation reliability of the position sensor.

For example, in a differential transformer position sensor disclosed in Japanese Patent Early publication No. 2002-90106, it is proposed that a magnetic core is coaxially disposed in a metal cylinder formed by a stainless steel pipe, and a resin material is filled as a buffer member in a clearance between an outer peripheral surface of the magnetic core and the metal cylinder. In this case, the strength of the magnetic core as a whole can be increased by the presence of the metal cylinder between the magnetic core and the detection coil. However, as the distance between the inner peripheral surface of the detection coil and the magnetic core increases, a ratio of magnetic fluxes reaching the magnetic core relative to the magnetic fluxes generated from the detection coil decreases, so that a deterioration in sensitivity of the position senor may occur. In addition, since the diameter size of the magnetic core increases, it is needed to make a suitable design change to the magnetic coil. Furthermore, there is another problem of reducing a rising amount of output sensitivity relative to an insertion amount of the magnetic core into the detection coil.

SUMMARY OF THE INVENTION

In view of the above problems, a primary concern of the present invention is to provide a position sensor that despite of not having a structural design change in a magnetic core and a detection coil, the magnetic core can be smoothly displaced in the detection coil without receiving an external force.

That is, the position sensor of the present invention comprises a tubular detection coil, a magnetic core movable in the detection coil, a drive circuit configured to provide a constant alternating voltage or a constant alternating current to the detection coil, a signal processing circuit configured to convert a change in impedance of the detection coil caused by a displacement of the magnetic core in the detection coil into an electric signal, and a guide means comprising a guide portion connected to the magnetic core and a support portion configured to slidably support the guide portion, and is characterized in that the guide means is formed such that the magnetic core is displaced in the detection coil without contacting an inner surface of the detection coil by a sliding movement of the guide portion relative to the support portion.

According to the present invention, since the displacement of the magnetic core is restricted in only a center-axis direction of the detection coil by the sliding movement of the guide portion, it is possible to certainly prevent that the magnetic core comes into contact with the inner peripheral surface of the detection coil by an undesired displacement of the magnetic core in a direction other than the center-axis direction. Consequently, the magnetic core is prevented from receiving a stress or strain, and a change in impedance of the detection coil resulting from the Villari effect can be avoided.

In the position sensor described above, it is preferred that the guide portion has a rod-like member connected to an end of the magnetic core, the support portion comprises a tubular member formed such that an outer peripheral surface of the rod-like member slidably contacts an inner surface of the tubular member, and the tubular member is disposed such that an axial direction of the rod-like member supported in the tubular member is in agreement with an axial direction of the detection coil.

In addition, as another preferred embodiment of the above position sensor, the guide portion has at least one guide bar extending in substantially parallel with the magnetic core. The support portion has an opening, in which the magnetic core is inserted, at an end of the detection coil, and a guide opening(s), in which the at least one guide bar is inserted, at the periphery of the opening. The at least one guide bar inserted in the guide opening(s) is movable in an axial direction of the detection coil at the outside of the detection coil. In this case, there is an advantage that the position sensor has a reduced total length in a case that an insertion amount of the magnetic core in the detection coil is at the maximum. In this embodiment, it is also preferred that the at least one guide bar is a pair of guide bars, and the guide opening, in which one of the guide bars is inserted, is angularly spaced from the guide opening, in which the other guide bar is inserted, by substantially 90 degrees around a center axis of the detection coil. Moreover, it is preferred that the guide openings, in which the pair of guide bars are inserted, are formed in a substantially rectangular shape, and a longitudinal direction of one of the guide openings is in a substantially orthogonal relationship with the longitudinal direction of the other guide opening. In this case, it is possible to prevent a swinging phenomenon of the magnetic core caused at a small insertion amount of the magnetic core in the detection coil, and achieve stable guiding over the entire stroke range of the magnetic core. That is, the function of guiding the magnetic core can be further improved by reducing a play of the guide bar. To prevent the guide bar from falling off from the guide opening, it is preferred that a stopper is attached to an end portion of the guide bar inserted in the guide opening.

As a further preferred embodiment of the present invention, the position sensor has a case, in which the detection coil is accommodated. The case has an opening at its one end, in which the magnetic core can be inserted. The guide portion has at least one guide bar extending in substantially parallel with the magnetic core. The support portion slidably support the at least one guide bar in an axial direction of the detection coil at the outside of the detection coil in the case. In this case, it is particularly preferred to slidably support the at least one guide bar in an aperture formed along the axial direction in a sidewall of the case. Since the support portion is formed in a part of the case, the interior space of the position sensor can be effectively utilized. As a result, there is an advantage of downsizing the position sensor. Moreover, there is another advantage that a design change in the detection coil and the magnetic core is not needed to form the guide means. Furthermore, it is possible to reduce the number of parts of the position sensor, and therefore achieve a reduction in production cost. When the case is made of a ferromagnetic material, a shielding function of protecting the magnetic core from external magnetic fluxes and radiation noises can be also obtained.

In addition, as still another preferred embodiment of the position sensor described above, the support portion comprises an opening, in which the magnetic core can be inserted, at an end of the detection coil, and at least one rod-like projection extending in substantially parallel with an axial direction of the detection coil, and the guide portion has a guide opening, in which the rod-like projection can be inserted. In this case, it is further preferred that a stopper is attached to an end portion of the rod-like projection inserted in the guide opening to prevent the rod-like projection from falling off from the guide opening.

As a further preferred embodiment of the position sensor described above, the guide portion comprises a rod-like member connected to an end of the magnetic core, and an outer tubular member connected to the rod-like member. The magnetic core is accommodated is the outer tubular member. The support portion comprises an inner tubular member, in which the detection coil is disposed. An inner surface of the outer tubular member slidably contacts an outer surface of the inner tubular member in an axial direction of the detection coil. When the inner tubular member is made of a ferromagnetic material, it is possible to protect the magnetic core from external magnetic fluxes and radiation noises. In addition, from the viewpoint of preventing the occurrence of eddy current, it is preferred that one of the inner tubular member and the outer tubular member has a substantially C-shaped cross section over a region in its axial direction.

In addition, as an additional preferred embodiment of the present invention, the position sensor has a tubular shield member disposed around the detection coil. The guide portion comprises a rod-like member connected to an end of the magnetic core, and a tubular member connected to the rod-like member. The magnetic core is accommodated in the tubular member. An outer surface of the tubular member slidably contacts an inner surface of the tubular shield member as the support portion in an axial direction of the detection coil. Alternatively, it is preferred that the guide portion comprises a rod-like member connected to an end of the magnetic core, and a tubular member connected to the rod-like member. The magnetic core is accommodated in the tubular member. The support portion comprises an inner tube, in which the detection coil is disposed, and an outer tube disposed around the inner tube through a clearance. The tubular member is slidably supported in the clearance between the inner tube and the outer tube in an axial direction of the detection coil.

Further characteristics of the present invention and advantages brought thereby will become more apparent from the best mode for carrying out the invention described below.

BEST MODE FOR CARRYING OUT THE INVENTION

A position sensor of the present invention is explained in detail below according to preferred embodiments.

(Basic Structure of the Position Sensor)

Figures 1A, 1B:
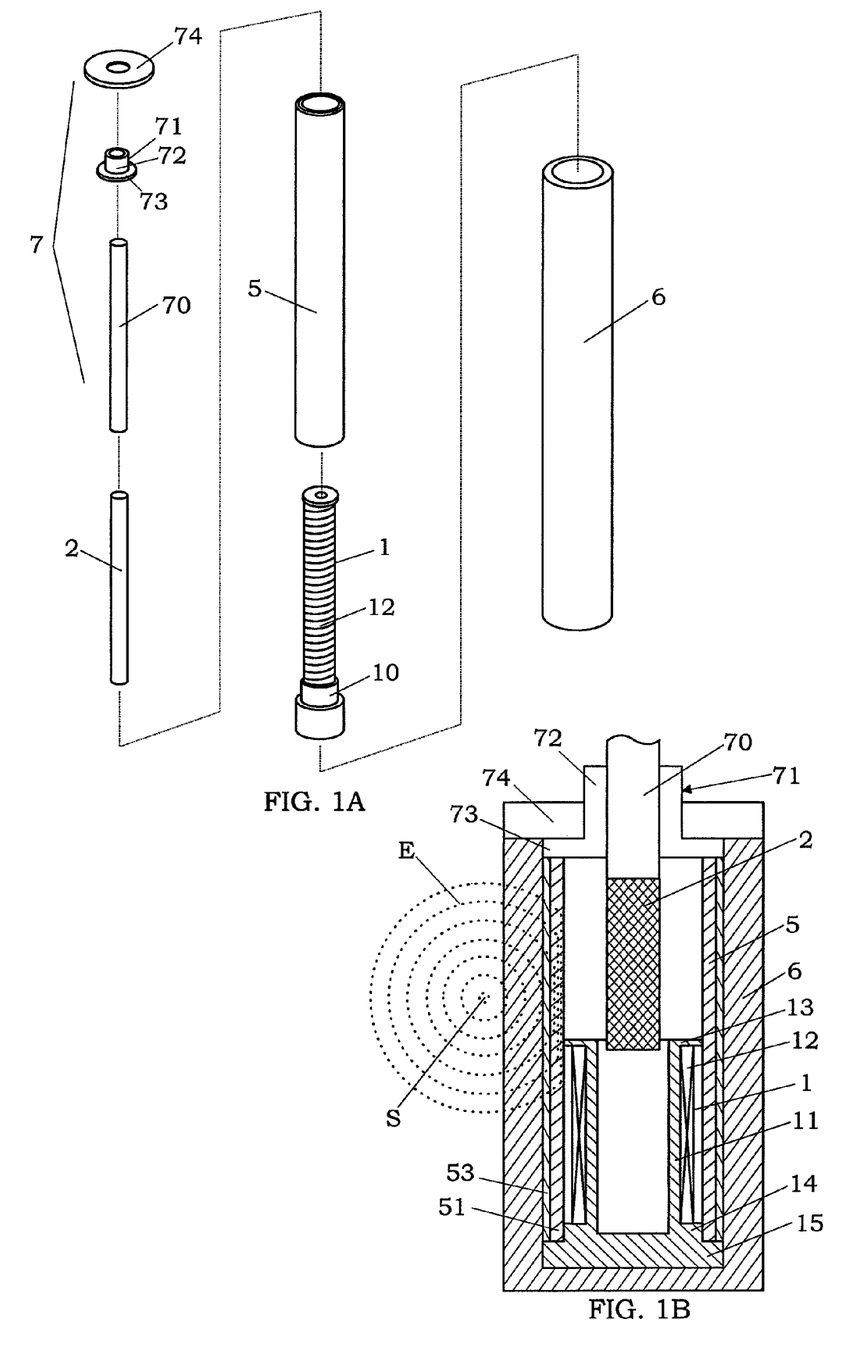
FIGS. 1A and 1B are respectively exploded perspective and cross-sectional views of a position sensor according to a first embodiment of the present invention.
Figure 2:
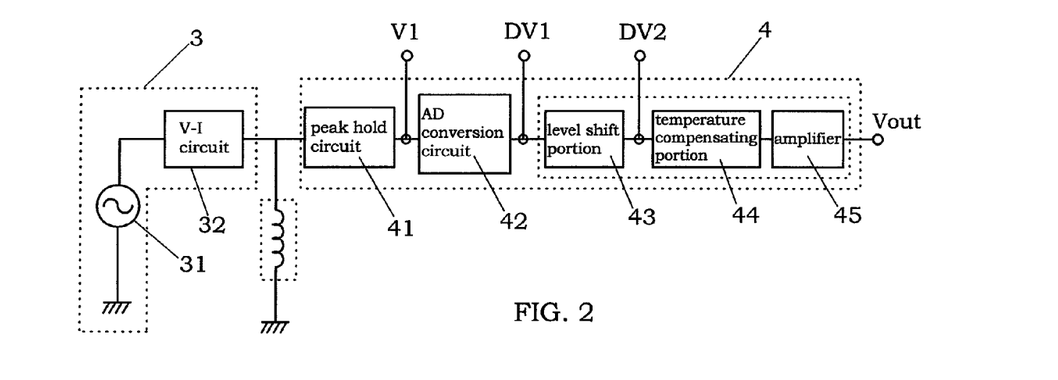
FIG. 2 is a block diagram of a drive circuit and a signal processing circuit of the position sensor.

First, a basic structure of the position sensor is explained. As shown in FIGS. 1A, 1B and 2, this position sensor is mainly composed of a tubular detection coil 1, a magnetic core 2 movable in the detection coil 1, a drive circuit 3 for providing a constant alternating voltage or a constant alternating current to the detection coil 1, a signal processing circuit 4 for converting a change in impedance of the detection coil 1 caused by a displacement of the magnetic core 2 in the detection coil 1 into an electric signal, a shield member 5 disposed around the detection coil 1, a case 6 for accommodating the shield member 5 therein, and a guide means 7 formed such that the magnetic core 2 can be displaced in the detection coil 1 without contacting an inner surface of the detection coil 1.

The detection coil 1 is formed by winding a lead wire 12 around a coil bobbin 10 having a substantially cylindrical shape. The coil bobbin 10 can be made of a thermosetting resin or the like. As shown in FIG. 1B, the coil bobbin 10 is integrally equipped with a winding body 11 formed in a long cylindrical shape having openings at its opposite ends, a first flange 13 formed in a circular-ring shape at an upper side of the winding body 11, a second flange 14 formed in a disk shape at a lower side of the winding body to close the bottom opening, and a pedestal 15 formed in a disk shape at the lower side of the second flange.

On the other hand, the magnetic core 2 is formed in a long, round bar shape by use of a magnetic material such as ferrite. In this embodiment, the winding body 11 is formed such that an axial length (a size in the up and down direction) of the winding body is larger than the axial length (a size in the up and down direction) of the magnetic core 2. In addition, since an inner diameter of the winding body 11 is larger than an outer diameter of the magnetic core 2, the magnetic core 2 can be moved (displaced) in the axial direction in the coil bobbin 10. The pedestal 15 has a larger outer diameter than the second flange 14, and the shield member 5 is placed on this pedestal 15.

The shield member 5 is disposed between an inner surface of the case 6 and the detection coil 1 to obtain a desired magnetic shielding effect. The shield member is not limited to a specific structure. For example, it is formed in a double layer structure with a first shield portion 51 formed in a tubular shape and a metal plating layer 53 formed on an outer surface of the first shield portion 51. In this case, it is preferred that the first shield portion 51 is made of an iron-based metal that is a ferromagnetic material, and particularly ferrite. The metal plating layer 53 is preferably made of copper, copper-nickel alloy, silver, gold or the like, which has higher electrical conductivity than the iron-based metal material.

The case 6 is formed in a long cylindrical shape having a top opening and a closed bottom end by use of an insulating resin. It is preferred that axial lengths of the shield member 5 and the case 6 are not smaller than the length corresponding to a movable range of the magnetic core 2. In this case, the magnetic core 2 can be always shielded. Therefore, even when an outer conductor S is located adjacent to the shield member 5, most of magnetic fluxes of an external magnetic field E generated from the outer conductor S do not pass through the shield member. Due to this reason, the magnetic fluxes of the external magnetic field E do not make interlinkage with the detection coil 1 to prevent that an induced electromotive force is generated in the detection coil 1 by the external magnetic field E.

The guide means 7 that is a characterizing portion of the present invention is mainly formed with a guide portion (e.g., 70) connected to the magnetic core 2 and a support portion (e.g., 71) for slidably supporting the guide portion. The detail structure and effects of the guide means are explained in each of the preferred embodiments described later.

The drive circuit 3 is not limited, and therefore a conventional one can be used. For example, as shown in FIG. 2, the drive circuit 3 is a constant current circuit for outputting a constant current having predetermined frequency and amplitude to the detection coil 1. The constant current circuit is provided with an oscillation circuit 31 for generating a constant voltage obtained by superimposing an alternating voltage having predetermined frequency and amplitude on a direct-current voltage having a predetermined amplitude, and a V-I circuit (voltage-current conversion circuit) 32 for converting the constant voltage output from the oscillation circuit into a constant current.

The signal processing circuit 4 is not specifically limited, and therefore a conventional one can be used. For example, as shown in FIG. 2, the signal processing circuit 4 outputs an output signal Vout indicative of a positional information of the magnetic core relative to the detection coil according to a peak value V1 of a voltage across the detection coil (detection signal), which is determined by the impedance of the detection coil and the constant current output from the drive circuit 3. In this embodiment, the signal processing circuit 4 is provided with a peak hold circuit 41, an AD conversion circuit 42, and a digital operation block including a level shift portion 43, a temperature compensating portion 44 and an amplifier 45. In the peak hold circuit 41, the peak value V1 of the voltage across the detection coil is extracted. In the AD conversion circuit 42, the peak value is converted into a digital signal DV1. In the level shift portion 43 of the digital operation block, a level shift is performed as a digital signal operation by the addition of a predetermined digital amount to output a digital signal DV2. In the temperature compensating portion 44, an operation for temperature compensation is performed to the digital signal DV2. In the amplifier 45, a digital signal output from the temperature compensating portion 44 is amplified to provide the output signal Vout.

First Embodiment

The present embodiment is characterized by using a guide means comprising guide and support portions with the following features in the position sensor with the basic structure described above. That is, as shown in FIG. 1A, the guide portion of this embodiment is a shaft 70 having an outer diameter substantially equal to the magnetic core 2, and connected to an upper end surface of the magnetic core 2. An upper end surface of the shaft 70 is connected to an object to be detected (not shown). On the other hand, the support portion is provided with a tubular bearing member 71, which is formed such that an outer peripheral surface of the shaft 70 slidably contact an inner surface of the bearing member, and a ring-like cover 74 for securing the bearing member 71 to a predetermined position in the case 6.

The bearing member 71 is integrally formed with a cylindrical portion 72 having opposite open ends, and a circular flange 73 outwardly extending from a bottom end of the cylindrical portion. The cylindrical portion 72 is formed to have an inner diameter slightly larger than the outer diameter of the shaft 70, so that the shaft 70 is slidably supported in the axial direction (up and down direction) by the cylindrical portion 72. An outer diameter of the flange portion 73 is determined such that the flange portion is fitted into the top opening of the case 6. The cover 74 is made of an insulating resin or the like. The cylindrical portion 72 of the bearing member 71 is inserted into a central opening of the ring-like cover 74. Therefore, the bearing member 71 is disposed in the top opening of the case 6 such that an axial direction of the shaft 70 supported in the cylindrical portion 72 is in agreement with the axial direction of the detection coil 1, and then fixed by the cover 74.

Next, an operation of the position sensor described above is explained. When the shaft 70 is moved downwardly from a condition that the magnetic core 2 is located at a highest position in the detection coil 1, as shown in FIG. 1B, according to a displacement of the object, the magnetic core 2 is pushed into the detection coil 1 by the shaft 70. At this time, since the shaft 70 is slidably supported in the center-axial direction of the detection coil 1 by the bearing member 71, the displacement of the magnetic core 2 is restricted in only the center-axial direction of the detection coil by the shaft 70 and the bearing member 71 in order to prevent a deviation or an inclination of the displacement direction of the magnetic core 2 in the detection coil 1. Thus, since a stable reciprocating movement of the magnetic core 2 on the center axis of the detection coil 1 is always obtained without any contact of the magnetic core 2 with the inner surface of the detection coil 1, it is possible to prevent a change in impedance of the detection coil 1 resulting from the Villari phenomenon. In addition, since the shaft 70 connected to the magnetic core 2 is supported by the bearing member 71, the magnetic core 2 does not directly contact the bearing member 71. Therefore, even when a stress or strain is loaded to the shaft 70, the magnetic core 2 is free from the stress or strain.

Figure 3:
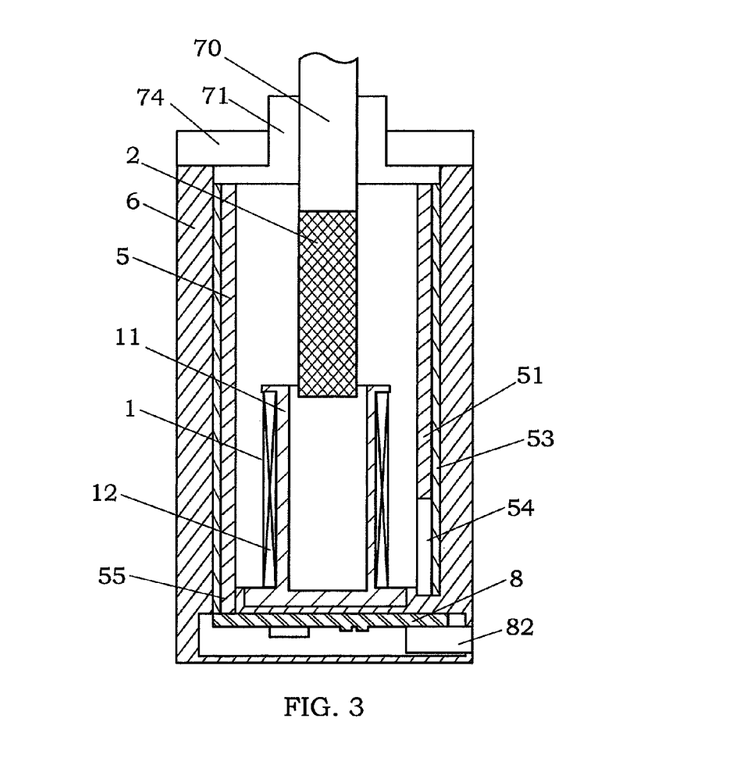
FIG. 3 is a cross-sectional view of a position sensor according to a modification of the first embodiment.

As a modification of the position sensor of the present embodiment, for example, a printed circuit board 8 may be disposed under the detection coil 1 in a bottom end portion of the case 6, as shown in FIG. 3. In the attached figure, the drive circuit 3 and the signal processing circuit 4 are mounted on a lower surface of the printed circuit board 8, and a wiring pattern for stable potential point such as grounding is formed on an upper surface of the printed circuit board 8. The shield member 5 is integrally formed at its lower end with a projecting piece 55, through which the shield member 5 is electrically connected to the wiring pattern for stable potential point of the printed circuit board 8. In this case, the effect of shielding radiation noises can be further increased. In addition, when soldering plating or gold plating is performed to a lower surface of the projecting piece 55 to make the electrical connection with the stable potential point of the printed circuit board 8, there is an advantage of further improving the contact reliability with the printed circuit board 8. Moreover, since the first shield portion 51 of the shield member 5 is formed in an electrically discontinuous manner with respect to the circumferential direction of the shield member by forming a slit 54 over a predetermined axial region, an improvement in linearity of coil impedance can be achieved. In the drawings, the numeral 82 designates a notched portion formed in the bottom end portion of the case 6 to make an electrical connection between the printed circuit board 8 and an external power supply.

Second Embodiment

Figure 4A:
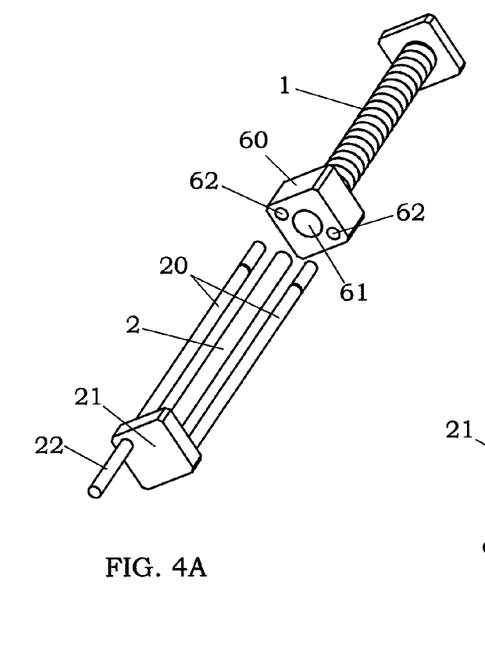
FIGS. 4A and 4B are respectively exploded and complete perspective views of a guide means of a position sensor according to a second embodiment of the present invention.
Figure 4B:
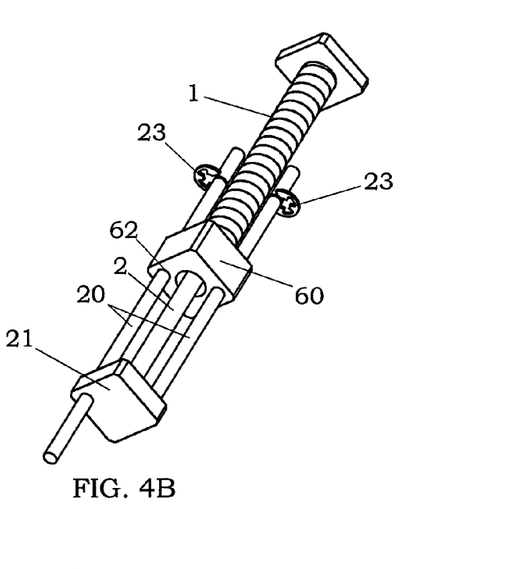

The present embodiment is characterized by using a guide means comprising guide and support portions with the following features in the position sensor with the basic structure described above. That is, as shown in FIG. 4A, the guide portion of this embodiment is provided with a pair of guide bars 20 formed in a columnar shape to extend in substantially parallel with the magnetic core 2, a coupling plate 21 formed in a substantially square shape and used to couple the magnetic core 2 with the guide bars, and a rod-like projection 22 used for a connection with an object to be detected. When the guide bar 20 is formed by a tubular member such as a pipe material, a reduction in weight of the guide portion can be achieved. On the other hand, the support portion 60 of this embodiment attached to one end of the coil bobbin 10 of the detection coil 1 has an opening 61, through which the magnetic core 2 is inserted into the detection coil 1, and guide openings 62, into which the pair of the guide bars 20 are inserted. The guide openings 62 are located at the periphery of the opening 61 such that one of the guide openings is angularly spaced from the other guide opening by substantially 180 degrees around a center axis of the detection coil 1. As shown in FIG. 4B, the guide bars 20 are supported in the guide openings 62 to be slidable in the axial direction of the detection coil at the outside of the detection coil 1.

When the guide bars 20 inserted in the guide openings 62 are slid in the axial direction of the detection coil 1, the displacement of the magnetic core 2 is restricted in only the center-axial direction of the detection coil to prevent a deviation or an inclination of the displacement direction of the magnetic core 2 in the detection coil 1. Thus, a stable reciprocating movement of the magnetic core 2 on the center axis of the detection coil 1 is always obtained without any contact of the magnetic core with the inner surface of the detection coil 1. Therefore, it is possible to prevent a change in impedance of the detection coil 1 resulting from the Villari phenomenon. In addition, since the guide bars 20 are slidable at the outside of the detection coil 1, any design change is not needed to increase the inner diameter of the detection coil 1. Moreover, there is an advantage that the position sensor has a reduced total length in a case that an insertion amount of the magnetic core 2 in the detection coil 1 is at the maximum. To prevent the guide bars 20 from falling off from the guide openings 62, it is preferred that a stopper 23 is attached to an end portion of each of the guide bars 20 inserted in the guide openings 62.

Figures 5A, 5B:
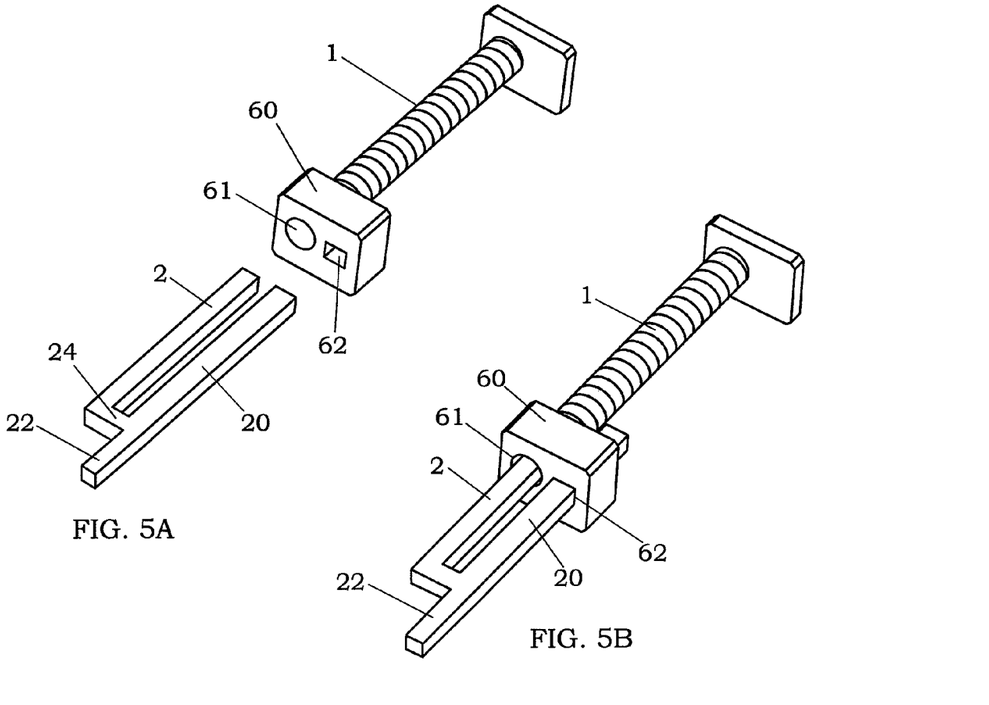
FIGS. 5A and 5B are respectively exploded and complete perspective views of a guide means according to a modification of the second embodiment.

The guide means explained above has the pair of guide bars 20. Alternatively, the number of the guide bar may be one. For example, as shown in FIGS. 5A and 5B, a single guide bar 20 having a rectangular cross section and extending in substantially parallel with the magnetic core 2 can be integrally formed with the magnetic core 2 through a coupling portion 24. In this case, since the guide bar 20 and the magnetic core 2 are made of a same material by means of integral molding, it is possible to reduce the total number of parts of the position sensor. On the other hand, the support portion 60 attached to one end of the coil bobbin 10 of the detection coil 1 has a circular opening 61, through which the magnetic core 2 is inserted into the detection coil 1, and a guide opening 62, into which the guide bar 20 is inserted, located adjacent to the opening 61. As in the case described above, since the guide bar 20 is slidably supported in the guide opening 62 in the axial direction of the detection coil at the outside of the detection coil 1, the same effect of guiding the magnetic core 2 can be obtained. The number of the guide bars may be three or more. When the guide function with higher accuracy is needed, it is preferred that four guide bars are formed so as to be angularly spaced from each other by 90 degrees around the center axis of the detection coil 1. In this case, it is possible to uniformly prevent a deviation of the displacement direction of the magnetic core from the center axis of the detection coil 1.

Figure 6A:
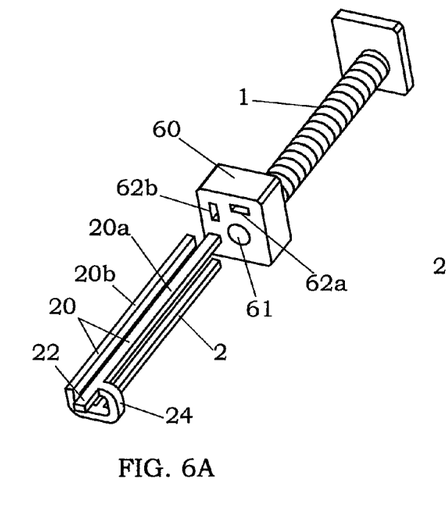
FIGS. 6A and 6B are respectively exploded and complete perspective views of a guide means according to another modification of the second embodiment.
Figure 6B:
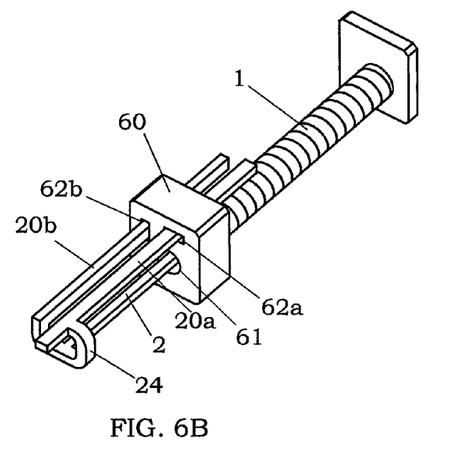

As a preferred modification of this embodiment, it is preferred that the guide means comprises guide and support portions shown in FIGS. 6A and 6B. That is, this guide portion has a pair of guide bars (20a, 20b) each having a substantially rectangular cross section. A rectangular opening 62a, in which one of the guide bars 20a is inserted, is angularly spaced from a rectangular opening 62b, in which the other guide bar 20b is inserted, by substantially 90 degrees around the center axis of the detection coil 1. In addition, a longitudinal direction of one of the rectangular openings 62a is in a substantially orthogonal relation with the longitudinal direction of the other rectangular opening 62b. Each of the rectangular openings is formed to be slightly larger than the rectangular cross section of the guide bar in such a degree that the guide bar inserted in the rectangular opening does not wobble. In this case, since the rectangular openings (62a, 62b) of the support portion 60 have the substantially orthogonal relation with each other, there is an advantage of reducing wobbling (or play) of the displacement direction of the magnetic core 2, as compared with a case that the pair of rectangular openings are angularly spaced from each other by substantially 180 degrees around the center axis of the detection coil 1, and the longitudinal directions of the rectangular openings extend in parallel to each other. In brief, it is possible to effectively prevent the wobbling of the displacement direction of the magnetic core 2 from the center axis of the detection coil 1 in spite of using a reduced number of the guide bars. From the viewpoint of reducing the number of parts, it is preferred that the guide bar 20 is integrally formed by use of the same material as the magnetic core 2 through the coupling portion 24.

Third Embodiment

Figures 7A, 7B:
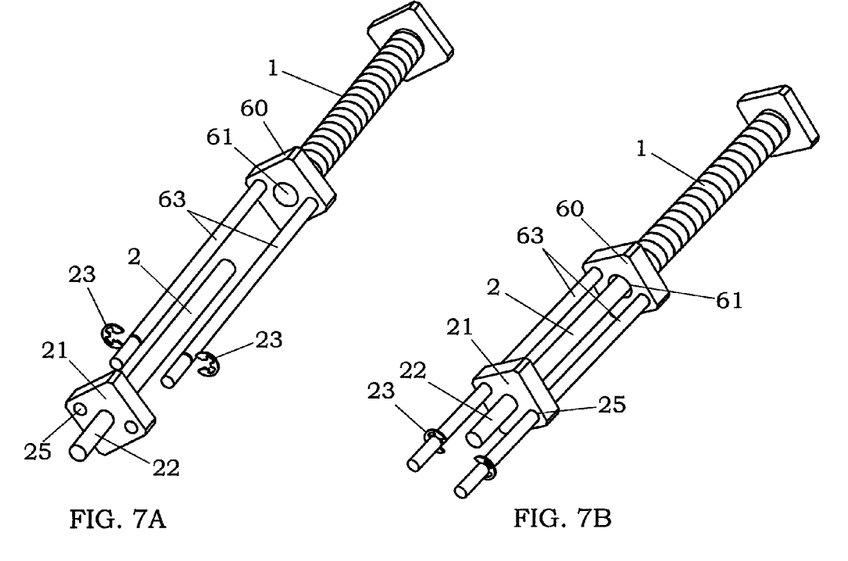
FIGS. 7A and 7B are respectively exploded and complete perspective views of a guide means of a position sensor according to a third embodiment of the present invention.

The present embodiment is characterized by using a guide means comprising guide and support portions with the following features in the position sensor with the basic structure described above. That is, as shown in FIGS. 7A and 7B, the support portion 60 of this embodiment has an opening 61, into which the magnetic core 2 is inserted, at one end of the detection coil 1, and a pair of columnar projections 63, which are angularly spaced from each other by substantially 180 degrees around the center axis of the detection coil 1 and extend in substantially parallel to each other in the axial direction of the detection coil 1. On the other hand, the guide portion is provided with a coupling plate 21 having a substantially square shape and a rod-like projection 22 used for a connection with an object to be detected. The coupling plate 21 connected to the magnetic core 2 has guide openings 25, into which the columnar projections 63 are respectively inserted. The pair of the columnar projections 63 are slidably supported in the guide openings 25 in the axial direction of the detection coil at the outside of the detection coil 1. In this case, as described in the second embodiment, the displacement of the magnetic core 2 is restricted in only the center-axial direction of the detection coil by the sliding movement of the columnar projections 63 in the guide openings 25. Therefore, it is possible to prevent a deviation or an inclination of the displacement direction of the magnetic core 2 in the detection coil 1. In addition, this embodiment has an inherent advantage that a decrease in mechanical load acting on the object to be detected can be achieved by a reduction in weight of the guide portion connected to the magnetic core 2. As described in the second embodiment, it is preferred that a stopper 23 is attached to an end portion of each of the columnar projections 63 inserted in the guide openings 25 to prevent the columnar projections 63 from falling off from the guide openings 25.

Fourth Embodiment

Figure 8A:
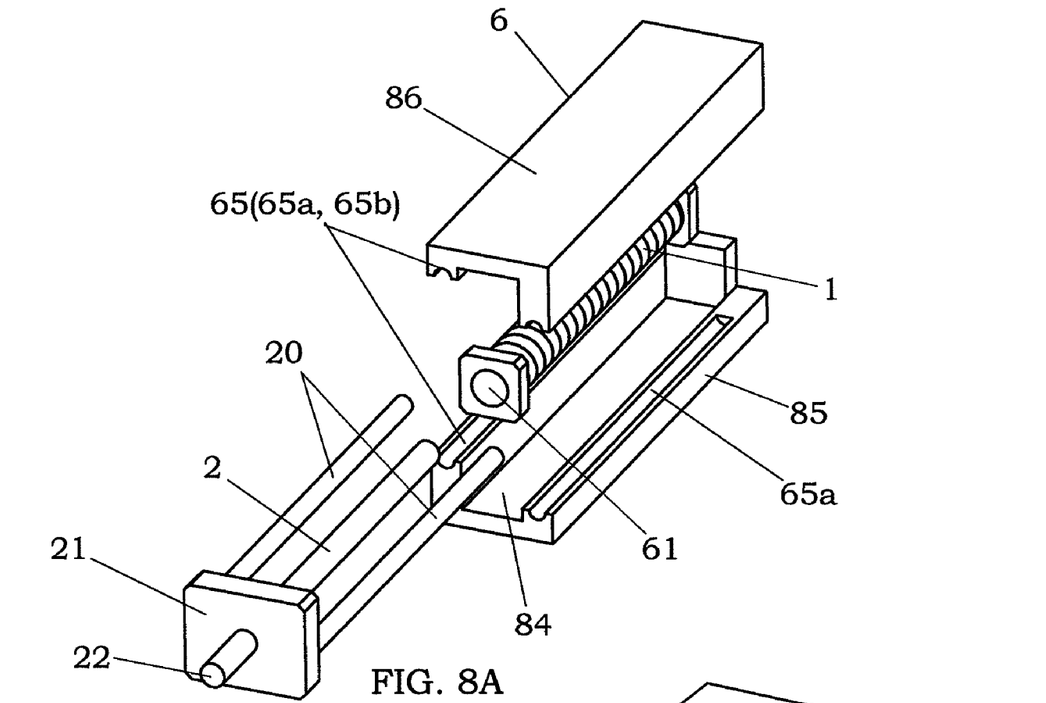
FIGS. 8A and 8B are respectively exploded and complete perspective views of a guide means of a position sensor according to a fourth embodiment of the present invention.
Figure 8B:
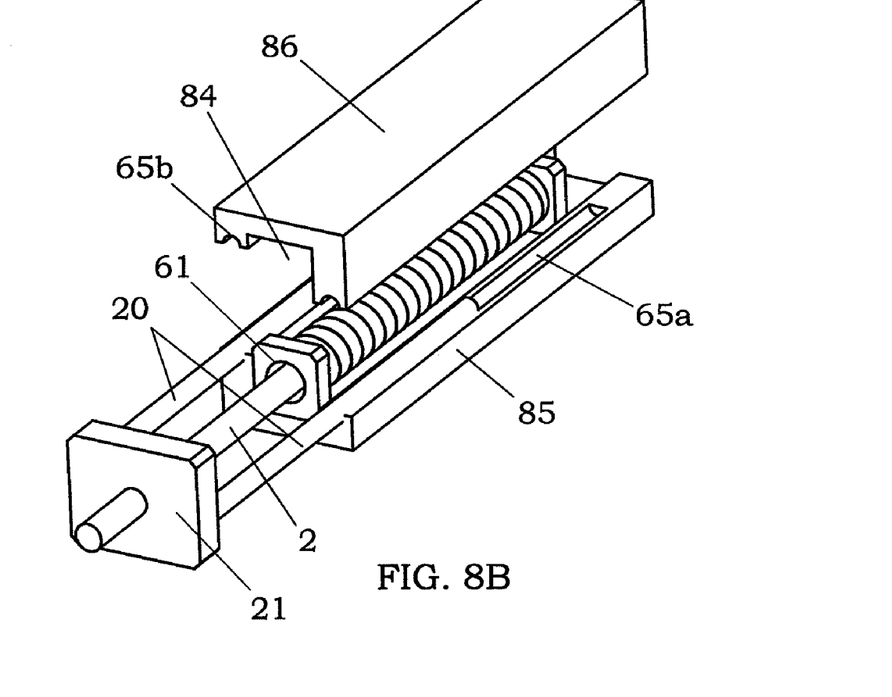

The present embodiment is characterized by using a case 6 and a guide means comprising guide and support portions with the following features in the position sensor with the basic structure described above. That is, as shown in FIG. 8A, the case 6 of this embodiment is a substantially rectangular case, which can be divided into two parts (85, 86). The detection coil 1 is accommodated in the case 6. The case has an opening 84 at its one end, through which the magnetic core 2 can be inserted. As in the case of the second embodiment, the guide portion is provided with a pair of guide bars 20 formed in a columnar shape and extending in substantially parallel to the magnetic core 2, a coupling plate 21 having a substantially square shape and used to couple the guide bars 20 with the magnetic core 2, and a rod-like projection 22 used for a connection with the object to be detected. As shown in FIG. 8B, the pair of guide bars 20 are slidably supported in guide openings 65 formed as the support portion in a pair of sidewalls of the rectangular case 6. In this embodiment, the rectangular case 6 can be divided into a base 85 and a case cover 86. Coupling surfaces of the base 85 and the case cover 86 have elongate grooves (65a, 65b) formed in a circular arc shape. When the base 85 is coupled to the case cover 86, these elongate grooves provide the guide openings 65. In this case, there is an advantage that dirt or dust accumulated in the guide openings 65 can be readily cleaned. In addition, the case 6 can be downsized by forming the guide openings 65 in the sidewalls of the rectangular case. If necessary, a shield member 5 can be disposed in a space between the detection coil 1 and an inner surface of the rectangular case. Alternatively, it is preferred that the case 6 is made of a ferromagnetic material. In this case, the case 6 has a shielding property.

According to the guide means having the above features, the displacement of the magnetic core 2 is restricted in only the center-axial direction of the detection coil by the sliding movement of the guide bars 20 in the guide openings 65 in the axial direction of the detection coil 1. Therefore, it is possible to prevent a deviation or an inclination of the displacement direction of the magnetic core 2 in the detection coil 1. Thus, since a stable reciprocating movement of the magnetic core 2 on the center axis of the detection coil 1 is always obtained without any contact of the magnetic core with the inner surface of the detection coil 1, it is possible to certainly prevent a change in impedance of the detection coil 1 resulting from the Villari phenomenon. In addition, since the guide bars 20 are movably supported by the case 6, it is not needed to make a design change to the detection coil 1 accommodated in the case 6. Furthermore, as described in the second embodiment, there is an advantage that the position sensor has a reduced total length in a case that an insertion amount of the magnetic core 2 into the detection coil 1 is at the maximum.

Fifth Embodiment

Figure 9:
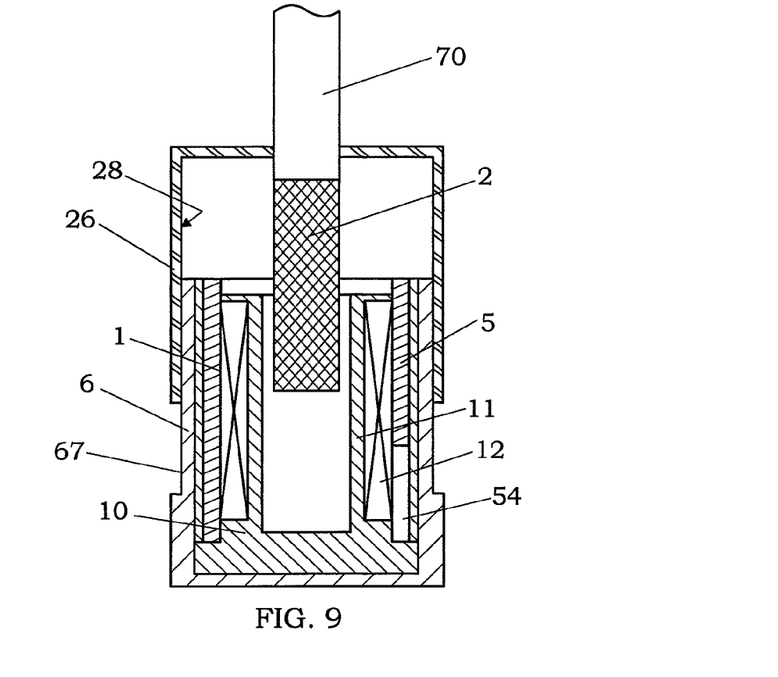
FIG. 9 is a cross-sectional view of a position sensor according to a fifth embodiment of the present invention.

The present embodiment is characterized by using a guide means comprising guide and support portions with the following features in the position sensor with the basic structure described above. That is, as shown in FIG. 9, the guide portion of this embodiment is composed of a shaft 70 connected to an end of the magnetic core 2, and an outer tubular member 26 having a cylindrical shape, which is connected to the shaft 70. The magnetic core is accommodated in the outer tubular member 26. The outer tubular member 26 has an opening at its lower end, and an inner diameter of the outer tubular member is designed to be slightly larger than an outer diameter of an upper portion of a case 6 described below. The outer tubular member 26 is formed at its upper end with a top board having a through hole, in which the shaft 70 is inserted. The top board is integrally formed with an outer peripheral wall of the outer tubular member. Therefore, a connecting portion between the lower end of the shaft 70 and the upper end of the magnetic core 2 is located in the outer tubular member 26, and a connecting portion (not shown) between the upper end of the shaft 70 and the object to be detected is located at the outside of the outer tubular member 26. The outer tubular member may be made of a nonmagnetic material. When the outer tubular member 26 is made of a ferromagnetic material such as iron, as in the case of the shield member 5, it is possible to protect the magnetic core 2 from external magnetic fluxes and radiation noises.

On the other hand, the support potion of this embodiment is provided by an outer peripheral surface 67 of the case 6, so that an inner peripheral surface 28 of the outer tubular member 26 slidably contacts the outer peripheral surface 67 of the case 6 in the axial direction of the detection coil 1. A lower portion of the case 6 has a larger diameter than the portion slidably contacting the outer tubular member 26. A step provided at the boundary between those portions functions as a stopper wall. That is, when an insertion amount of the magnetic core 2 in the detection coil 1 is at the maximum, a lower end of the outer tubular member 26 contacts the stopper wall. In addition, since each of the outer tubular member 26 and the case 6 has the cylindrical shape, and they are coaxially arranged, the outer tubular member 26 is rotatably supported around the center axis of the case 6. In addition, as in the case shown in FIG. 3, the shield member 5 of this embodiment has a predetermined axial region with a slit 54, which is formed in an electrically discontinuous manner with respect to the circumferential direction, in order to improve the linearity of coil impedance.

According to the guide means having the above features, the displacement of the magnetic core 2 is restricted in only the center-axial direction of the detection coil 1 by the sliding movement of the outer tubular member 26 along the outer peripheral surface 67 of the case 6 in the axial direction of the detection coil 1. Therefore, it is possible to prevent a deviation or an inclination of the displacement direction of the magnetic core 2 in the detection coil 1. Consequently, as in the case of the other embodiments, a change in impedance of the detection coil 1 resulting from the Villari phenomenon can be prevented. In addition, since the outer tubular member 26 is movably supported by the case 6, it is not needed to make a design change in the detection coil 1 accommodated in the case 6. Furthermore, as in the case of the second embodiment, there is an advantage that the position sensor has a reduced total length in a case that the insertion amount of the magnetic core 2 in the detection coil 1 is at the maximum.

Sixth Embodiment

Figure 10:
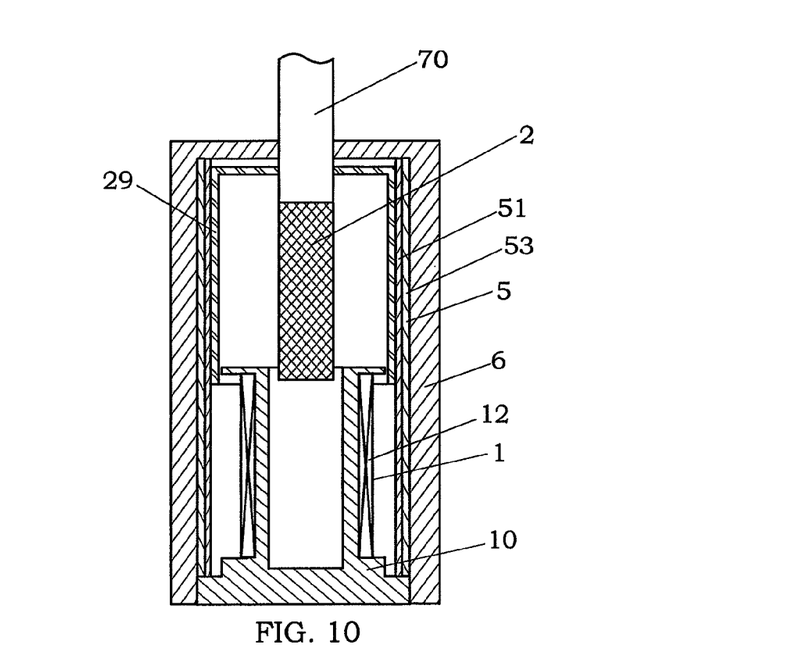
FIG. 10 is a cross-sectional view of a position sensor according to a sixth embodiment of the present invention.

The present embodiment is characterized by using a guide means comprising guide and support portions with the following features in the position sensor with the basic structure described above. That is, as shown in FIG. 10, the guide portion of this embodiment is composed of a shaft 70 connected to an end of the magnetic core 2, and an inner tubular member 29 having a cylindrical shape, which is connected to the shaft 70. The magnetic core 2 is accommodated in the inner tubular member 29. The inner tubular member 29 has an opening at its lower end, and an outer diameter of the inner tubular member is designed to be slightly smaller than an inner diameter of a shield member 5 described below. The inner tubular member 29 is formed at its upper end with a top board having a through hole, in which the shaft 70 is inserted. The top board is integrally formed with a sidewall of the inner tubular member. Therefore, a connecting portion between the lower end of the shaft 70 and the upper end of the magnetic core 2 is located in the inner tubular member 29, and a connecting portion (not shown) between the upper end of the shaft 70 and an object to be detected is located at the outside of the inner tubular member 29. In addition, it is preferred that the inner tubular member 29 has a predetermined axial region with a slit, which is formed in an electrically discontinuous manner with respect to the circumferential direction, in order to prevent the occurrence of eddy current in the inner tubular member 29.

On the other hand, the support portion of this embodiment is provided by an inner peripheral surface of the shield member 5, so that an outer peripheral surface of the inner tubular member 29 slidably contacts the inner peripheral surface of the shield member 5 in the axial direction of the detection coil 1. The shield member 5 of this embodiment has a double layer structure, which is composed of a first shield portion 51 having a tubular shape and a metal plating layer 53 formed on an outer surface of the first shield portion 51. The metal plating layer has higher electrical conductivity than the metal material constructing the first shield portion 51. Therefore, the outer peripheral surface of the inner tubular member 29 slidably contacts an inner peripheral surface of the first shield portion 51. In addition, when an insertion amount of the magnetic core 2 in the detection coil 1 is at the maximum, a lower end of the inner tubular member 29 contacts an upper surface of the pedestal 15 of the coil bobbin 10. Therefore, the pedestal 15 of the coil bobbin can be used as a stopper for the guide means.

According to the guide means having the above features, the displacement of the magnetic core 2 is restricted in only the center-axial direction of the detection coil 1 by the sliding movement of the inner tubular member 29 along the inner peripheral surface of the shield member 5 in the axial direction of the detection coil 1. Therefore, it is possible to prevent a deviation or an inclination of the displacement direction of the magnetic core 2 in the detection coil 1. Consequently, as in the case of the other embodiments, a change in impedance of the detection coil 1 resulting from the Villari phenomenon can be prevented.

Figure 11:
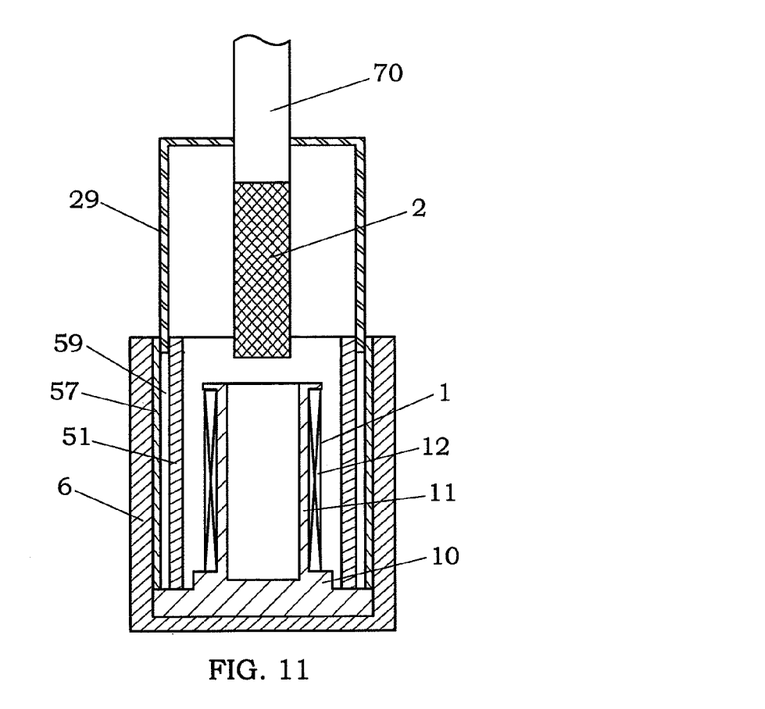
FIG. 11 is a cross-sectional view of a position sensor according to a modification of the sixth embodiment.

In addition, as show in FIG. 11, the shield member 5 may be formed with a first shield portion 51 having a tubular shape, which is located inside, and a second shield portion 57 having a tubular shape, which is located outside and spaced from the first shield portion by a predetermined distance. In this case, the inner tubular member 29 described above is sidably supported in the axial direction by a clearance 59 between the first shield portion 51 and the second shield portion 57, thereby achieving the function of guiding the magnetic core 2, as in the case of the above embodiments.

Figure 12:
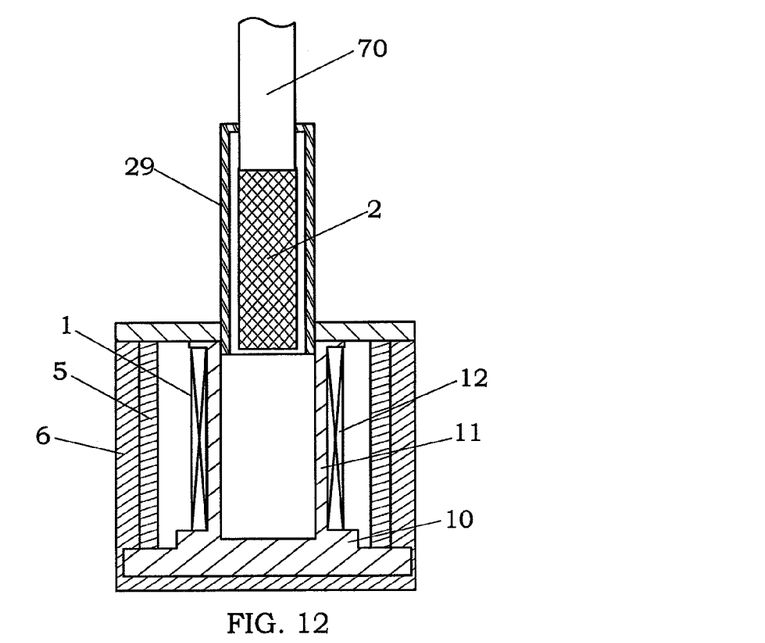
FIG. 12 is a cross-sectional view of a position sensor according to another modification of the sixth embodiment.

Alternatively, as shown in FIG. 12, the inner tubular member 29 can be designed to have a small outer diameter, which enables a structure that the outer peripheral surface of the inner tubular member 29 slidably contact an inner peripheral surface of the detection coil 1. In this case, a slight increase in inner diameter of the detection coil 1 occurs, the similar function of guiding the magnetic core 2 can be obtained.

The case and the shield member explained in the above embodiments have the cylindrical shape. Alternatively, they may be formed in a rectangular tubular shape. In addition, the position sensors of the above embodiments belong to a linear type (linear motion type) that the magnetic core is movable on a straight-line axis. Besides, the guide means of the present invention can be equivalently utilized for a rotational-type (curvilinear motion type) position sensor that the magnetic core is movable on a curved-line axis.

INDUSTRIAL APPLICABILITY

As described above, according to the present invention, the guide means for enabling a stable displacement of the magnetic core in the detection coil is formed without an increase in diameter size of the magnetic core or the detection coil. Therefore, it is possible to effectively prevent the Villari phenomenon, that is, a change in magnetic permeability caused by a contact of the magnetic core with an inner surface of the detection coil, and consequently provide a compact position sensor with high operational reliability. Thus, the position sensor of the present invention is expected to be utilized in various technical fields such as internal combustion and electric power facility.

The invention claimed is:

1. A position sensor comprising:
a tubular detection coil;
a magnetic core movable in said detection coil;
a drive circuit configured to provide a constant alternating voltage or a constant alternating current to said detection coil;
a signal processing circuit configured to convert a change in impedance of said detection coil caused by a displacement of said magnetic core in said detection coil into an electric signal; and
a guide comprising a guide portion connected to said magnetic core and a support portion configured to slidably support said guide portion,
wherein said guide is formed such that said magnetic core is displaced in said detection coil without contacting an inner surface of said detection coil by a sliding movement of said guide portion relative to said support portion, wherein said guide portion has at least one guide bar extending generally parallel to said magnetic core, wherein said support portion has an opening, in which said magnetic core is inserted, at an end of said detection coil, and at least one guide opening, in which said at least one guide bar is inserted, at the periphery of said opening, and wherein said at least one guide bar inserted in said at least one guide opening is movable in an axial direction of said detection coil at the outside of said detection coil.

2. The position sensor as set forth in claim 1, wherein said at least one guide bar is a pair of guide bars, and said at least one guide opening is a pair of guide openings, wherein a first guide opening of said pair of guide openings, in which one of said guide bars is inserted, is angularly spaced from a second guide opening of said pair of guide openings, in which the other guide bar is inserted, by substantially 90 degrees around a center axis of said detection coil.

3. The position sensor as set forth in claim 2, wherein said guide openings, in which said pair of guide bars are inserted, are formed in a substantially rectangular shape, and a longitudinal direction of one of said guide openings is in a substantially orthogonal relationship with the longitudinal direction of the other guide opening.

4. The position sensor as set forth in claim 1, further comprising a stopper attached to an end portion of said at least one guide bar inserted in said guide opening to prevent said guide bar from falling off from said guide opening.

5. The position sensor as set forth in claim 1, wherein said at least one guide bar is integrally formed with said magnetic core by use of a same material.

6. A position sensor comprising:
a tubular detection coil;
a magnetic core movable in said detection coil;
a drive circuit configured to provide a constant alternating voltage or a constant alternating current to said detection coil;
a signal processing circuit configured to convert a change in impedance of said detection coil caused by a displacement of said magnetic core in said detection coil into an electric signal; and
a guide comprising a guide portion connected to said magnetic core and a support portion configured to slidably support said guide portion,
wherein said guide is formed such that said magnetic core is displaced in said detection coil without contacting an inner surface of said detection coil by a sliding movement of said guide portion relative to said support portion,
a case, in which said detection coil is accommodated,
wherein said case has an opening at its one end, in which said magnetic core can be inserted,
wherein said guide portion has at least one guide bar extending generally parallel with said magnetic core, and
wherein said support portion slidably supports said at least one guide bar in an axial direction of said detection coil at the outside of said detection coil in said case.

7. The position sensor as set forth in claim 6, wherein said at least one guide bar is slidably supported in an aperture formed along the axial direction in a sidewall of said case.

8. The position sensor as set forth in claim 6, wherein said case is made of a ferromagnetic material.

9. A position sensor comprising:
a tubular detection coil;
a magnetic core movable in said detection coil;

a drive circuit configured to provide a constant alternating voltage or a constant alternating current to said detection coil;
a signal processing circuit configured to convert a change in impedance of said detection coil caused by a displacement of said magnetic core in said detection coil into an electric signal; and
a guide comprising a guide portion connected to said magnetic core and a support portion configured to slidably support said guide portion,
wherein said guide is formed such that said magnetic core is displaced in said detection coil without contacting an inner surface of said detection coil by a sliding movement of said guide portion relative to said support portion,
wherein said support portion comprises an opening, in which said magnetic core can be inserted, at an end of said detection coil, and at least one rod-like projection extending generally parallel to an axial direction of said detection coil, and
wherein said guide portion has a guide opening, in which said rod-like projection can be inserted.

10. The position sensor as set forth in claim 9, further comprising a stopper attached to an end portion of said rod-like projection inserted in said guide opening to prevent said rod-like projection from falling off from said guide opening.

11. A position sensor comprising:
a tubular detection coil;
a magnetic core movable in said detection coil;
a drive circuit configured to provide a constant alternating voltage or a constant alternating current to said detection coil;
a signal processing circuit configured to convert a change in impedance of said detection coil caused by a displacement of said magnetic core in said detection coil into an electric signal; and
a guide comprising a guide portion connected to said magnetic core and a support portion configured to slidably support said guide portion,
wherein said guide is formed such that said magnetic core is displaced in said detection coil without contacting an inner surface of said detection coil by a sliding movement of said guide portion relative to said support portion,
wherein said guide portion comprises a rod-like member connected to an end of said magnetic core, and an outer tubular member connected to said rod-like member, and
wherein said magnetic core is accommodated in said outer tubular member,
said support portion comprises an inner tubular member, in which said detection coil is disposed, and
an inner surface of said outer tubular member slidably contacts an outer surface of said inner tubular member in an axial direction of said detection coil.

12. The position sensor as set forth in claim 11, wherein said inner tubular member is made of a ferromagnetic material.

13. The position sensor as set forth in claim 11, wherein one of said inner tubular member and said outer tubular member has a substantially C-shaped cross section over a region in its axial direction.

14. A position sensor comprising:
a tubular detection coil;
a magnetic core movable in said detection coil;
a drive circuit configured to provide a constant alternating voltage or a constant alternating current to said detection coil;

a signal processing circuit configured to convert a change in impedance of said detection coil caused by a displacement of said magnetic core in said detection coil into an electric signal; and a guide comprising a guide portion connected to said magnetic core and a support portion configured to slidably support said guide portion, wherein said guide is formed such that said magnetic core is displaced in said detection coil without contacting an inner surface of said detection coil by a sliding movement of said guide portion relative to said support portion, a tubular shield member disposed around said detection coil, said guide portion comprises a rod-like member connected to an end of said magnetic core, and a tubular member connected to said rod-like member, wherein said magnetic core is accommodated in said tubular member, and wherein an outer surface of said tubular member slidably contacts an inner surface of said tubular shield member as said support portion in an axial direction of said detection coil.

15. The position sensor as set forth in claim 14, wherein one of said tubular shield member and said tubular member has a substantially C-shaped cross section over a region in its axial direction.

16. A position sensor comprising:
a tubular detection coil;
a magnetic core movable in said detection coil;
a drive circuit configured to provide a constant alternating voltage or a constant alternating current to said detection coil;

a signal processing circuit configured to convert a change in impedance of said detection coil caused by a displacement of said magnetic core in said detection coil into an electric signal; and a guide comprising a guide portion connected to said magnetic core and a support portion configured to slidably support said guide portion, wherein said guide is formed such that said magnetic core is displaced in said detection coil without contacting an inner surface of said detection coil by a sliding movement of said guide portion relative to said support portion, wherein said guide portion comprises a rod-like member connected to an end of said magnetic core, and a tubular member connected to said rod-like member, wherein said magnetic core is accommodated in said tubular member, said support portion comprises an inner tube, in which said detection coil is disposed, and an outer tube disposed around said inner tube through a clearance, and said tubular member is slidably supported in the clearance between said inner tube and said outer tube in an axial direction said detection coil.

* * * * *